July 12, 1960     T. G. MYERS     2,944,433
VARIABLE RATIO TRANSMISSION MECHANISM
Filed Jan. 28, 1957     4 Sheets-Sheet 1
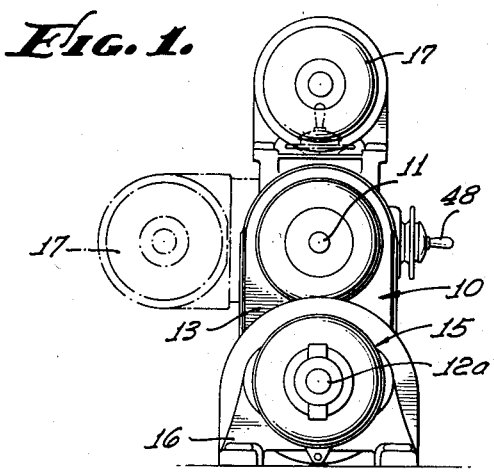
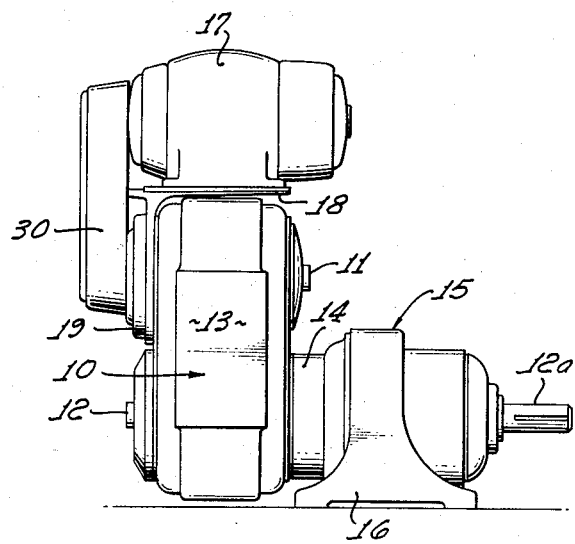
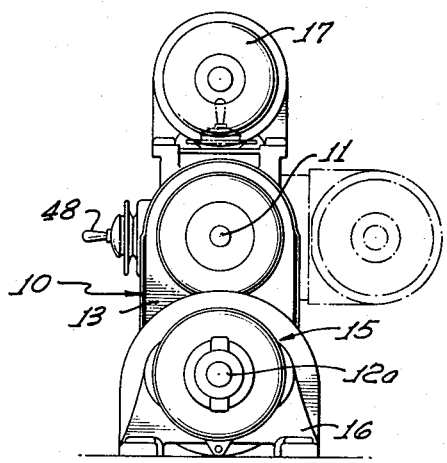
INVENTOR.
THOMAS G. MYERS
BY
Flam and Flam
ATTORNEYS.

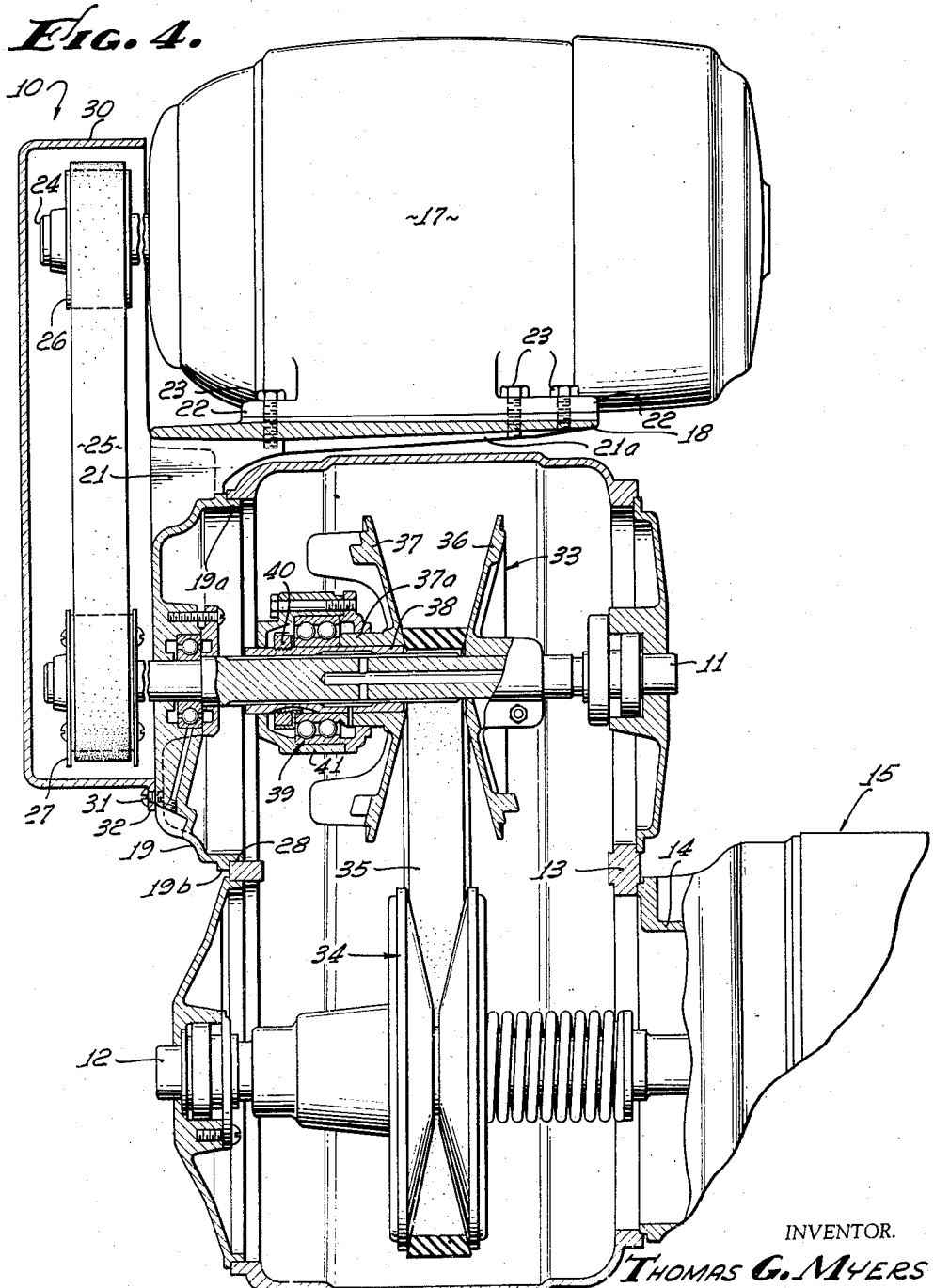

INVENTOR.
THOMAS G. MYERS
BY
Flam and Flam
ATTORNEYS.

July 12, 1960 T. G. MYERS 2,944,433
VARIABLE RATIO TRANSMISSION MECHANISM
Filed Jan. 28, 1957 4 Sheets-Sheet 4

THOMAS G. MYERS
INVENTOR.

BY Ham and Ham

ATTORNEYS.

United States Patent Office 2,944,433
Patented July 12, 1960

2,944,433

VARIABLE RATIO TRANSMISSION MECHANISM

Thomas G. Myers, Los Angeles, Calif., assignor to U.S. Electrical Motors, Inc., Los Angeles, Calif., a corporation of California Filed Jan. 28, 1957, Ser. No. 636,618

7 Claims. (Cl. 74—230.17)

This invention relates to an adapter bracket structure for a variable ratio or other transmission mechanism for facilitating adjustable mounting of a motor belt drive therefor.

In variable ratio transmission devices, for example, having variable diameter pulley structures respectively mounted on spaced parallel shafts, space considerations may make it undesirable or impossible to support a motor for direct drive of one of the shafts. The primary object of the present invention is to provide a simplified adapter bracket for a motor belt drive whereby the motor may be placed alongside a transmission structure rather than in end-to-end relationship thereto.

Another object of this invention is to provide an adapter bracket of this character that permits ready adjustment of the position of the motor relative to the variable transmission mechanism between alternate positions corresponding to a vertical stacked relationship and to a right angle cantilever relationship.

Still another object of this invention is to provide a structure in which a belt shield for the motor drive need not be disturbed when the position of the motor is altered. In this manner, cumbersome disassembly and assembly tasks are avoided, and proper driving relationship is uniformly ensured.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is an end view of a variable ratio transmission mechanism incorporating the present invention, an alternate left-hand position of the motor being illustrated in phantom lines;

Fig. 2 is a side elevation of the apparatus shown in Fig. 1;

Fig. 3 is an end view similar to Fig. 1, but illustrating a substitute bracket arrangement whereby an alternate right-hand position of the motor may be achieved;

Fig. 4 is an enlarged view, mostly in vertical section, illustrating the apparatus;

Figure 5:
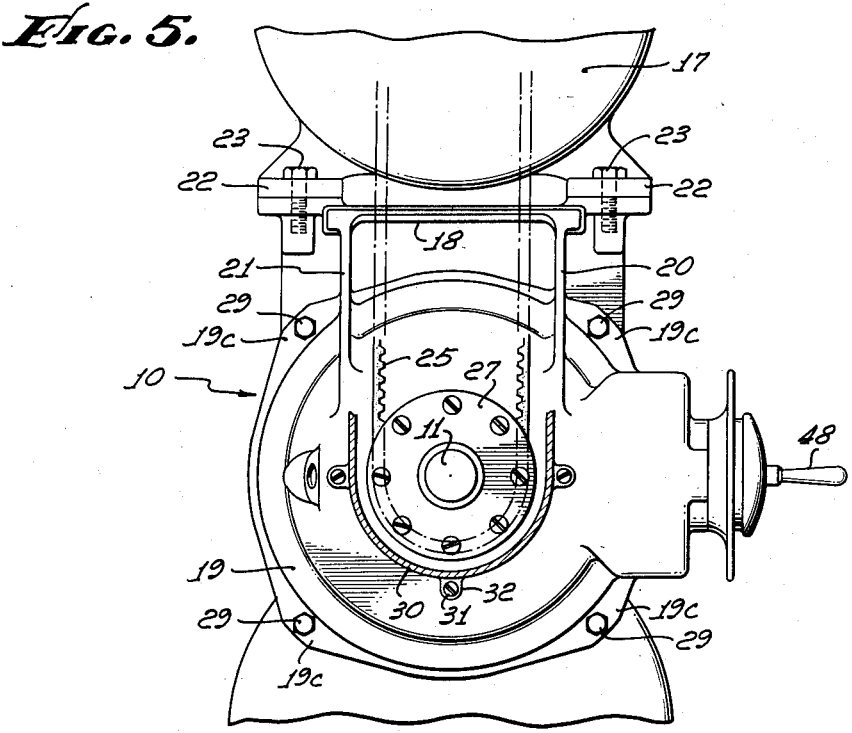
Fig. 5 is a fragmentary end view illustrating the mounting bracket, the belt protector being removed.

The variable ratio transmission mechanism 10 shown in Figs. 1 and 2 has an input shaft 11 and an output shaft 12. These shafts are horizontally disposed, with the input shaft 11 vertically above the output shaft 12. The shafts are both supported in a unitary casing 13 which provides openings about the ends of the shafts.

Conveniently, the casing 13 is mounted upon a flange 14 of a gear reduction device or unit 15, the flange 14 cooperating with that opening in the casing 13 formed about one end of the output shaft 12. The load driving shaft 12a forms the output of the gear reduction unit 15.

The housing for the device 15 includes a suitable standard 16 bolted or otherwise secured to the floor.

For driving the input shaft 11, a motor 17 is provided. In order to meet space requirements, the motor 17, instead of being located axially of the input shaft 11, as is customary, is mounted either alongside or above the variable ratio transmission casing 13. The manner in which this is made possible is shown to best advantage in Figs. 4 and 5.

The motor 17 rests upon and is attached to a supporting cantilever shelf 18 that extends along the top of casing 13. The shelf 18 is integrally joined to an end bracket 19 for the casing 13, which bracket supports one end of the input shaft 11. For joining the shelf 18 to the bracket 19, two parallel arms or ribs 20 and 21 (Fig. 5) are provided. These arms extend outwardly from the bracket 19 and are joined to the lateral edges of the cantilever shelf 18. These arms or ribs 20 and 21 are extended beneath the cantilever shelf 18, as at 21a (Fig. 4), to provide appropriate reinforcement. The shelf 18 and arms 20 and 21 are integrally cast. The motor 17 is mounted by its feet 22 which are engaged by cap screws 23 suitably threadedly cooperating with apertures in the shelf 18.

The motor shaft 24 is mounted parallel to but spaced from the input shaft 11 of the variable ratio transmission mechanism. For connecting these shafts, there is provided a belt 25, appropriately cooperable with pulley wheels 26 and 27 respectively carried in the corresponding projecting ends of the motor shaft 24 and the input shaft 11. This belt, if desired, may be transversely grooved to increase flexibility.

The bracket 19 is mounted securely at the casing opening 28. A cylindrical extension 19a formed at the bracket 19 is telescopically received in the opening 28. A flange 19b of the bracket 19 forms a stop cooperable with the edges about the casing opening 28 to limit telescopic movement of the bracket 19. Four ears 19c (Fig. 5) have apertures aligned with threaded openings equiangularly located about the bracket opening 28. Cap screws 29, passing through the apertures of the ears 19c and cooperable with the threaded openings, secure the bracket 19 in position.

Since the threaded apertures in the casing which receive the cap screws 29 are equiangularly located, the bracket 19 can be rotated through an angle corresponding to the angular spacing between the fastening means. Thus, in Fig. 5, the bracket 19 is located in a position at which the cantilever shelf 18 is located above the transmission housing 13. This corresponds to the full-line position illustrated in Fig. 1. By reorienting the bracket 19, the shelf 18 can be placed vertically alongside the upper portion of the transmission casing 13, as illustrated in phantom lines in Fig. 1. In adjusting the position of the bracket 19, it is unnecessary to disconnect the belt 25 from the pulley 27 carried by the input shaft 11, since the belt may rotate the pulley 27 about its axis in the course of this adjustment; the axis of the pulley and the axis of the adjustment of the bracket 19 coinciding.

A belt guard 30, overlying the ends of the shafts 24 and 11 and their respective pulleys 26 and 27 as well as the belt 25, is maintained in appropriate relationship throughout the course of such angular adjustment of the bracket 19. For this purpose, the guard 30 is mounted upon the end bracket 19 rather than upon the relatively stationary structure of the variable ratio transmission housing 13. Thus, machine screws 31 pass through an arcuate flange 32 of the guard 30 and engage the bracket 19.

The shafts 11 and 12 of the variable ratio transmission mechanism mount conventional variable diameter pulleys 33 and 34 which are connected together by an edge-active belt 35. The variable diameter pulley 33 for the input shaft conventionally comprises two opposed conical and axially separable pulley elements 36 and 37. One of these elements 36 is fixedly secured to the input shaft 11. The other element 37 is slidably connected to the input shaft 11 by a splined sleeve 38 about which the hub 37a of the pulley element is secured.

Movement of the pulley element 37 axially toward the opposite pulley element 36 increases the effective pulley diameter in a well-understood manner.

Figure 6:
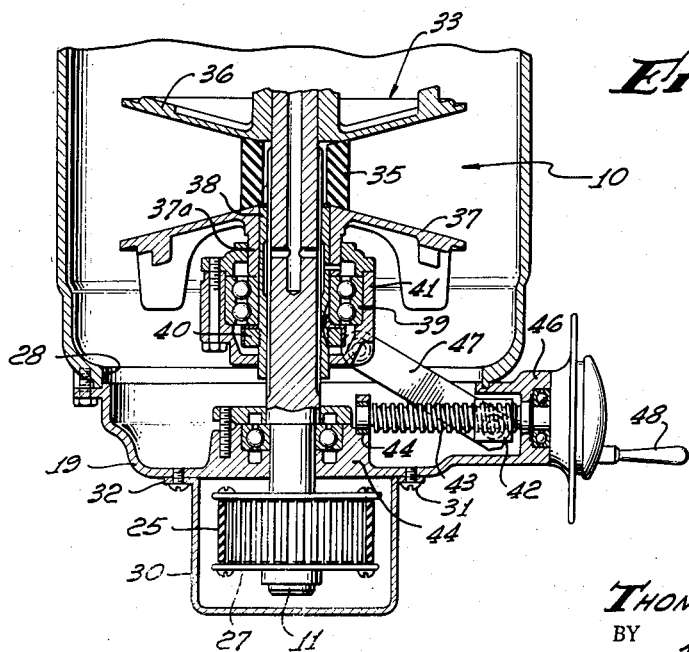
Fig. 6 is a fragmentary sectional view illustrating the input section of the variable ratio transmission mechanism.

For axially moving the pulley element 37, a ball bearing structure 39 (Fig. 6) is provided. The inner race of the bearing structure 39 is secured about the projecting portion of the splined sleeve 38, and confined between the end of the pulley element hub 37a and a nut 40 threaded on the end of the splined sleeve 38. A non-rotary two-part hollow member 41, clamped about the outer race of the bearing element 39, serves as a means for imparting axial movement to the ball bearing structure 39 as well as to the splined sleeve 38 and pulley element 37 carried thereby. The bearing 39 permits the member 41 to remain non-rotary while the pulley element 37 and splined sleeve 38 rotate.

For moving the member 41, a threaded cross-head 42 mounted upon a lead screw 43 is provided. The lead screw 43 is formed on a shaft piloted at one end in a bearing 44 mounted at the inner hub portion 45 of the bracket 19. The opposite end of the lead screw 43 is journaled in an embossment 46 extending radially of the bracket 19 formed thereon.

A link 47, pin-connected at opposite ends respectively to the cross-head 42 and the casing 41, causes the casing 41 to assume an axial position determined by the position of the cross-head 42.

A crank 48, joined to the outwardly projecting end of the lead screw 44, positions the cross-head. As the crank 48 is rotated in one direction, the cross-head 43 moves radially inwardly toward the hub 45 of the bracket 19 and causes the member 41 and the pulley section 37 coupled thereto to shift axially toward the section 36, as viewed in Fig. 6.

The member 41 is normally held by the link 47 and the associated mechanism against rotation. But the angular position of the casing 41 relative to the input shaft 11 is quite immaterial so far as the adjustment is concerned. Since the axis of the member 41 also coincides with the axis of adjustment of the bracket 19, the bracket 19 and member 41 may both be rotated about the input shaft 11 without in any manner disturbing the shifting mechanism.

The handle 48 is located in quadrature relationship to the shelf 18 about the bracket 19. Thus, as shown in Fig. 1, the handle 48 is accessible at the right-hand side of the casing 13 when the motor 17 is vertically above the transmission casing 13, and is accessible on top of the casing 13 when the motor is located on the left-hand side of the casing 13.

Movement of the motor 17 to the right-hand side of the casing 10, as shown in Fig. 1, is not possible since the lower portion of the transmission casing 13 interferes with the handle 48. While appropriate clearance could be provided by axially extending the bracket 19, this would detract materially from the compact arrangement. However, in order to permit the motor to be moved to either side, an alternate end bracket is provided, as shown in Fig. 3, in which the handle 48 normally extends on the counterclockwise side of the motor 17, as viewed in Fig. 3, rather than on the clockwise side thereof. In this instance, it is possible to locate the motor 17 either above the transmission casing 13 or on the right-hand side thereof, as shown in dotted lines in Fig. 3. In both instances, the handle 48 is equally accessible for manipulation.

By making available a right-hand and a left-hand end bracket, it is possible to supply diverse needs in accordance with the particular installation.

Optionally, a single end bracket could be provided in which two hubs are located at diametrically opposite sides of the bracket, one of which would be selectively operative to mount the lead screw 43 and the associated mechanism and the other of which would remain idle.

Figure 7:
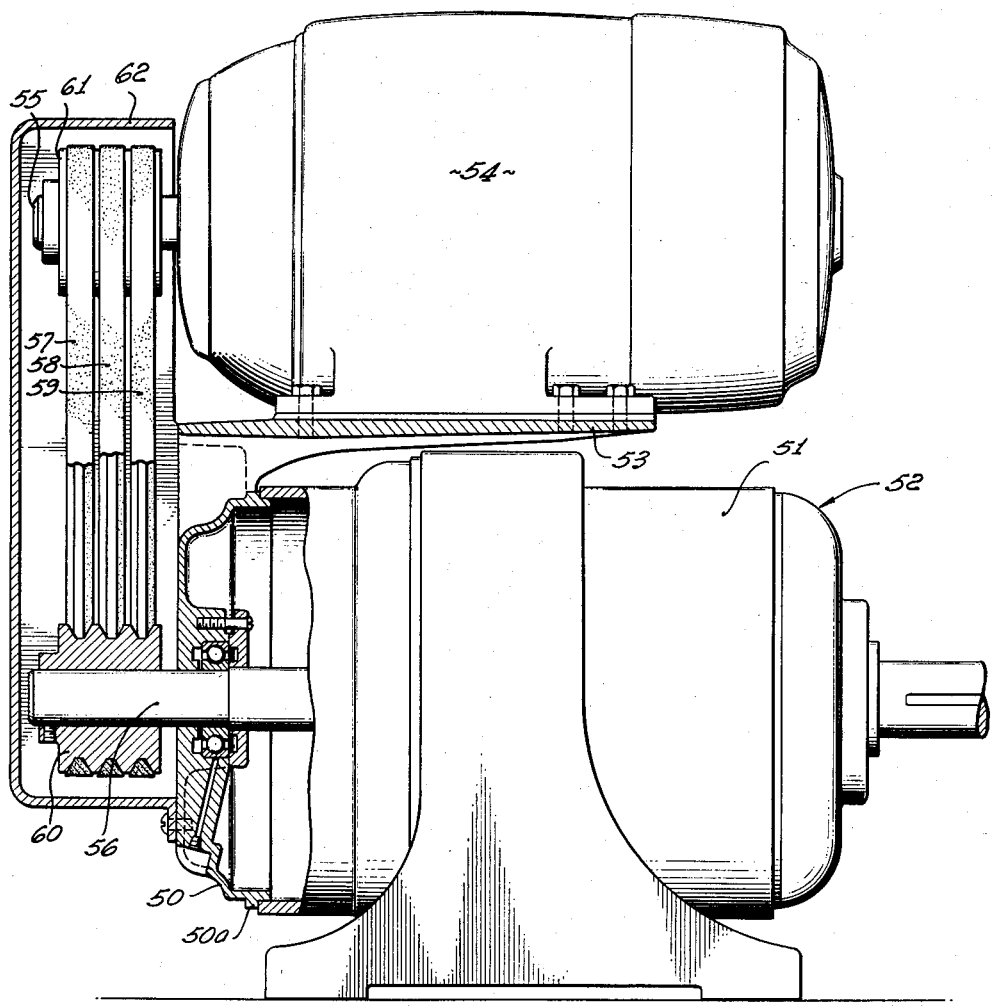
Fig. 7 is a view, partly in vertical section, showing a modified form of the present invention.

In the form shown in Fig. 7, an end bracket 50, similar to the end bracket 19 of the previous form, is illustrated in cooperative relationship with a housing 51 of a fixed ratio transmission mechanism 52.

The enlarged circular end of the bracket 50 projects slightly into the circular opening of the casing 51. The extent of telescopic relationship is limited by a flange 50a formed peripherally about the bracket 50. Appropriate cap screws (not shown), similar to the cap screws in the previous form, pass through ears (not shown) formed on the flange 50a and engage appropriately threaded lugs formed on the transmission mechanism casing 51.

As in the previous form, the bracket 50 provides a shelf 53 by the aid of which a motor 54 may be mounted alongside the transmission mechanism 51. In the present instance, the driving connection between the shaft 55 of the motor 54 and the shaft 56 of the transmission 51 is established by a multiple belt drive, including the series of V-belts 57, 58 and 59. Pulleys 60, 61, carried at the projecting ends of the shafts 56 and 55, appropriately cooperate with the V-belts 57, 58, 59. A guard 62, secured to the bracket 50, appropriately protects the V-belts 57, 58, 59.

In the present instance, since no mechanism for adjusting the ratio of transmission is carried by the bracket 50, the shelf 53 and the motor 54 may be moved to either side of the transmission mechanism 51 without interference, as desired. The mechanism 52 may be similar to the mechanism 15 illustrated in Figs. 1 to 4, inclusive.

The inventor claims:

1. In combination: a variable ratio transmission mechanism having an input shaft; a casing for the mechanism, including a bearing bracket for the shaft; a wheel attached to the shaft and exteriorly of the casing; said bracket being capable of angular adjustment with respect to the shaft axis; a source of motion supported by aid of the bearing bracket; means driven by the source and coupled to the wheel; means supported by the bracket for adjusting the ratio of the transmission mechanism; and a cover for the wheel and said driven means, supported on the bracket.

2. In combination: a variable ratio transmission mechanism having an input shaft, a pair of pulley sections having opposed inclined belt engaging faces mounted on the shaft, and forming by relative axial adjustment, variable effective pulley diameters, said mechanism also having means for providing said relative axial adjustment; a casing for the mechanism, having a bracket capable of angular adjustment with respect to the shaft axis, to a plurality of positions; a pulley carried by the shaft exterior of the casing; an electric motor for driving the pulley; a support carried by the bracket for the motor; said support extending over the casing; means supporting the pulley section adjusting means on the bracket; and a belt drive coupling the motor to the pulley.

3. In combination: a variable ratio transmission mechanism having an input shaft, a pair of pulley sections having opposed inclined belt engaging faces mounted on the shaft, and forming by relative axial adjustment, variable effective pulley diameters, said mechanism also having means for providing said relative axial adjustment; a casing for the mechanism, having a bracket capable of angular adjustment with respect to the shaft axis, to a plurality of positions; a pulley carried by the shaft exterior of the casing; an electric motor for driving the pulley; a support carried by the bracket for the motor; said support extending over the casing; means supporting the pulley section adjusting means on the bracket; a belt drive coupling the motor to the pulley; and a guard for the belt drive and also supported by the bracket.

4. For use with a variable ratio transmission mechanism of the type wherein the axial position of a device along an input shaft determines the effective ratio of transmission, the shaft being accessible at an opening of the casing: an end bracket for supporting the input shaft, and cooperable with the casing opening; means detachably securing the bracket to the casing at a predetermined one of a number of angular positions thereof with respect to the input shaft; means supported by the bracket and cooperable with the device for axially positioning the device; and a shelf integrally formed with the bracket extending in a direction substantially parallel to the input shaft but spaced therefrom, said shelf extending from the bracket on that side of the bracket which faces the casing whereby the shelf may mount a motor alongside the casing.

5. For use with a variable ratio transmission mechanism of the type wherein the axial position of a device along an input shaft determines the effective ratio of transmission, the shaft being accessible at an opening of the casing: an end bracket for supporting the input shaft, and cooperable with the casing opening; means detachably securing the bracket to the casing at a predetermined one of a number of angular positions thereof with respect to the input shaft; means supported by the bracket and cooperable with the device for axially positioning the device; and a shelf integrally formed with the bracket extending in a direction substantially parallel to the input shaft but spaced therefrom, said shelf extending from the bracket on that side of the bracket which faces the casing; a motor secured to the shelf and having a shaft spaced from but parallel to said input shaft; endless flexible means connecting the shafts; and a guard for the connecting means carried by the bracket.

6. In apparatus of the character described: a casing; a transmission mechanism supported in the casing and having an input shaft, said shaft having an end extending outwardly of the casing; said casing having an opening through which the shaft passes; an end bearing bracket having a flange cooperable with the edge of the opening and attached to the casing at any of a plurality of angular positions about the axis of the shaft; a single bearing structure carried by the bracket for the end of the shaft, and forming the sole support by the bracket for the shaft; a shelf carried by the bearing bracket, the major portion of the shelf extending over the casing; a motor mounted on the shelf; and means for coupling the motor to the input shaft for driving said shaft.

7. In apparatus of the character described: a casing; a transmission mechanism supported in the casing and having an input shaft, said shaft having an end extending outwardly of the casing; said casing having an opening through which the shaft passes; an end bearing bracket having a flange cooperable with the edge of the opening and attached to the casing at any of a plurality of angular positions about the axis of the shaft; a single bearing structure carried by the bracket for the end of the shaft, and forming the sole support by the bracket for the shaft; a shelf carried by the bearing bracket, the major portion of the shelf extending over the casing; a motor mounted on the shelf; a first pulley carried by the shaft; a second pulley driven by the motor; a belt connecting said pulleys; and a guard extending over the pulleys and the belt, and supported solely by said end bracket.

References Cited in the file of this patent

UNITED STATES PATENTS

| | | |
|---|---|---|
| 1,794,496 | Ramsey | Mar. 3, 1931 |
| 1,874,261 | Evelyn | Aug. 30, 1932 |
| 2,293,617 | Myers | Aug. 18, 1942 |
| 2,783,654 | Carnell | Mar. 5, 1957 |